United States Patent [19]

Neighbors

[11] Patent Number: 4,884,328

[45] Date of Patent: Dec. 5, 1989

[54] PROCESS FOR MAKING DECORATIVE ITEM FROM ALUMINUM CANS

[76] Inventor: Charles M. Neighbors, 14141 Light St., Whittier, Calif. 90604

[21] Appl. No.: 308,021

[22] Filed: Feb. 9, 1989

[51] Int. Cl.[4] ........................ B21K 21/16; B23P 17/04; B23P 23/00

[52] U.S. Cl. ...................................... 29/401.1; 29/407; 29/434; 83/32; 83/54; 225/2; 98/80; 98/72; 206/572; 428/34.1; 446/217

[58] Field of Search .............................. 29/401.1, 407; 428/34.1, 7, 11, 542.2, 24; 225/2; 98/6, 60, 80, 117; 83/32, 54; 206/216, 572, 579; 220/1 BC; 446/210, 217

[56] References Cited

U.S. PATENT DOCUMENTS

| | | | |
|---|---|---|---|
| 1,434,563 | 11/1922 | Robertson | 446/217 |
| 2,139,143 | 12/1938 | Wiswell | 220/1 BC X |
| 2,158,770 | 5/1939 | Bartlett | 220/1 BC U X |
| 3,728,980 | 4/1973 | Fraze | 83/879 X |
| 4,014,088 | 3/1977 | Oshier | 428/24 X |
| 4,030,237 | 6/1977 | Lewis et al. | 446/217 X |
| 4,092,092 | 5/1978 | Dye et al. | 83/879 |
| 4,276,816 | 7/1981 | Tuley | 98/72 |
| 4,322,013 | 3/1982 | Tanaka | 220/1 BC X |

*Primary Examiner*—Charlie T. Moon

*Attorney, Agent, or Firm*—Edgar W. Averill, Jr.

[57] ABSTRACT

A kit for making a decorative item from an aluminum can and the process of using the kit. The kit has a can-holding member which has a pair of arms, at least one of which has a guide bar which abuts the surface of the can. A knife is drawn along the guide bar scribing a groove along the surface of the can. A series of grooves, preferably equally spaced, are formed around the can, and the can is then pressed inwardly to break the grooves and form a series of elongated slats around the can. These are bent outwardly to form a decorative object.

4 Claims, 1 Drawing Sheet

FIG. 1.
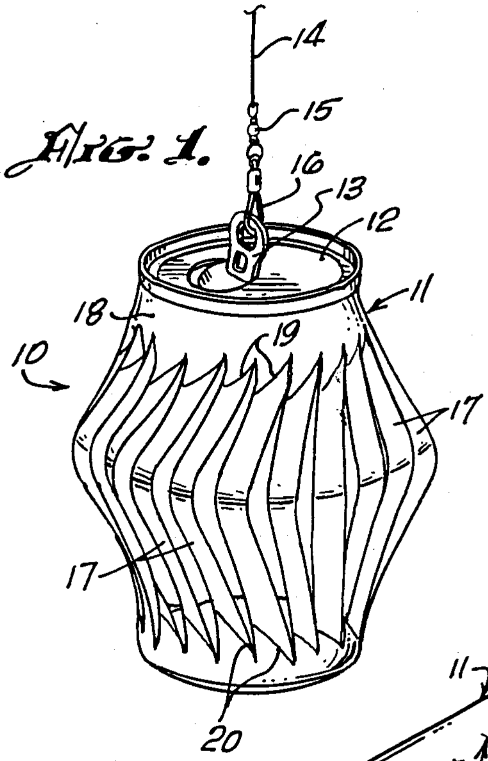
FIG. 3.
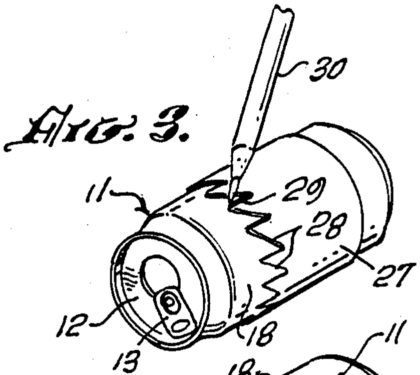
FIG. 4.
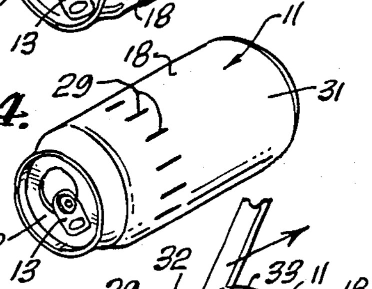
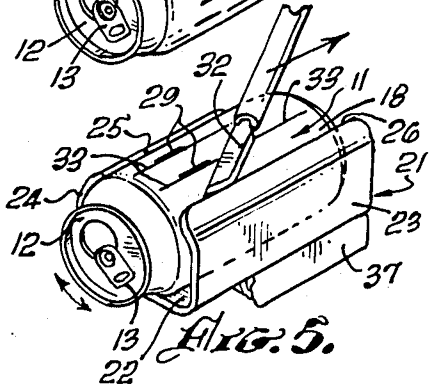
FIG. 5.
FIG. 2.
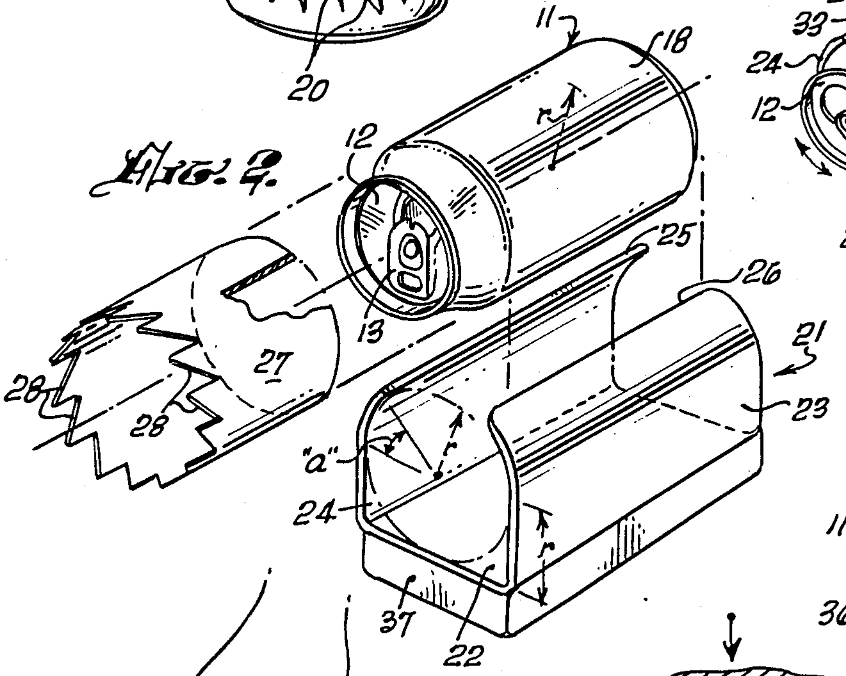
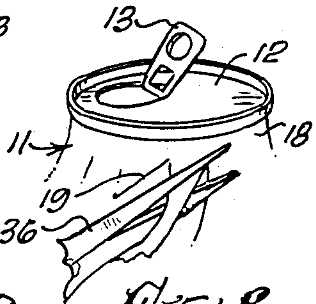
FIG. 8.
FIG. 6.
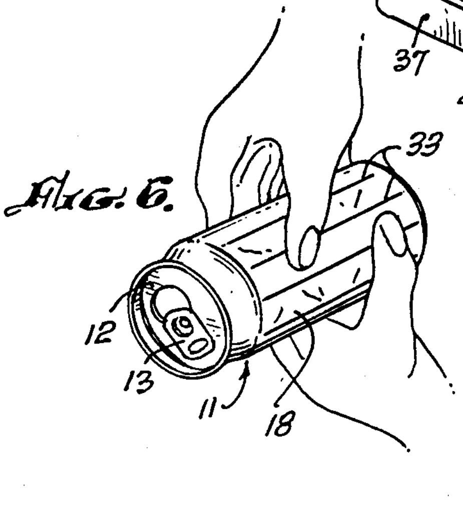
FIG. 7.
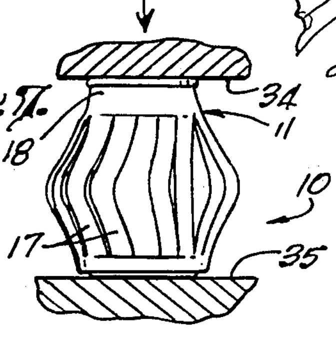

PROCESS FOR MAKING DECORATIVE ITEM FROM ALUMINUM CANS

BACKGROUND OF THE DISCLOSURE

The field of the invention is crafts, and the invention relates more particularly to crafts useful for making decorative objects.

With the widespread use of aluminum cans, these become an inexpensive raw material for making decorative objects. Efforts to form smooth cuts in such aluminum cans with tin snips result in a substantial amount of bending and a generally unsightly object.

SUMMARY OF THE INVENTION

The present invention is for a kit for making a decorative item from an aluminum can and the process of using the kit. The kit includes an aluminum can resting on a base, said aluminum can having a cylindrical side wall having a side wall radius. A first arm extends upwardly from the base a length greater than the side wall radius. The first arm abuts the side wall of the can on a first side of the can. A second arm extends upwardly from the base a length greater than the side wall radius, and the second arm firmly abuts the side wall of the can along the opposite side of the can from that which abuts the first arm. The second arm has a guide bar abutting the surface of the cylindrical side wall along a majority of the length of the aluminum can whereby a scribe line can be formed along the cylindrical side wall by drawing a knife along the guide bar. The first arm may also have a guide bar. The process for making the decorative item includes the steps of scribing a plurality of grooves in a generally longitudinal direction in the cylindrical side wall of an aluminum can. The resulting scribed can is pressed inwardly repeatedly on the scribed side wall until the side wall breaks at the scribed grooves to form a plurality of longitudinal slots. The slots are next bent outwardly to form a decorative item. An angled bend may be made at the top and bottom of each slat to provide an item which turns in the wind.

BRIEF DESCRIPTION OF THE DRAWINGS

FIG. 1 is a perspective view of the decorative item of the present invention.

FIG. 2 is an exploded perspective view of the kit useful for making the decorative item of FIG. 1.

FIG. 3 is a perspective view showing the aluminum can and the template of the kit of FIG. 2.

FIG. 4 is a perspective view of the marked can of the kit of FIG. 2.

FIG. 5 is a perspective view showing the aluminum can in a holder including a guide bar.

FIG. 6 is a perspective view showing the step of pressing a scribed aluminum can.

FIG. 7 is a side view showing the can of FIG. 6 after breaking at each scribe indicating the longitudinal slats being bent outwardly.

FIG. 8 is a perspective view of the upper part of the can of FIG. 7 showing an angled bend being made at the upper end of one of the slats of the decorative item of FIG. 1.

DESCRIPTION OF THE PREFERRED EMBODIMENTS

The decorative item of the present invention is shown in FIG. 1 and indicated generally by reference character 10. Item 10 is made from an aluminum can 11 which has a top 12 including a pop-top ring 13. A line 14 is attached through a swivel 15 and snap 16 to ring 13 to suspend the item 10. Decorative item 10 has a plurality of longitudinal slats 17 formed in the cylindrical side wall 18 of can 11. A series of angled bends 19 are formed at the top of each slat, and another series of angled bends 20 are formed at the bottom of each slat to cause each slat to be at an angle from the circumference. This results in a highly efficient turbine-like action whereby the item spins rapidly even in a light wind.

The kit for making the decorative item of FIG. 1 is shown in exploded perspective view in FIG. 2 and includes a can holder 21 which has a base 22, a first arm 23, and a second arm 24 which has a guide bar 25 at the upper edge thereof. First arm 23 also has a guide bar 26 at the upper end. Aluminum can 11 has a radius indicated by reference character "r" and, as indicated in FIG. 2, first arm 23 extends upwardly a length further than radius "r." Similarly, second arm 24 extends upwardly a distance further than radius "r." It can also be seen that second arm 24 has an upper curved portion which subtends an arc "a" of about 45° and, preferably, at least 10°. The kit is preferably affixed to a support block 37 which is preferably a wooden block with rubber support feet. This block 37 holds the kit over the table or other work surface and makes it easier to grasp the end of the can to turn it during the scribing step.

A template 27 is formed from card stock or other relatively stiff and durable material. Template 27 fits snugly around aluminum can 11 as shown in FIG. 3. Template 27 has a plurality of marking guides 28 formed at one end thereof. A plurality of lines 29, as shown in FIG. 4, are made with marking pen 30 shown in FIG. 3. The marked can 31 is then placed in can holder 21, as shown in FIG. 5, and a plurality of scribed lines 33 are scratched on the surface by knife 32 at the point of each line 29. The scribed can is then taken, as shown in FIG. 6, and pressed, or distorted, at each scribed line which causes the can to break at each line forming a plurality of longitudinal slats 17. The can is then compressed, as shown in FIG. 7, between surfaces 34 and 35 to cause the slats 17 to bend outwardly. Lastly, a plurality of angled bends 19 and 20 are formed with needle nose pliers 36 to angle the slat so that the resulting object 10 turns rapidly in the wind.

The resulting item may be decorated, or the original decorations on the can may simply be left on the outer surface of the decorative object. The longitudinal slats may be equally spaced, as shown in FIG. 1, or may be irregularly spaced for different decorative effects. While the slats are shown as being strictly longitudinal in FIG. 10, they could, of course, be formed at a slight angle from the longitude. Furthermore, the slats need not extend essentially the full length of the can, as shown in FIG. 1, but could extend, for instance, only about one-half the length. Also, while the guide bars 25 and 26 are shown at the terminus of the first and second arms, they could, instead, be formed by a thin longitudinal slit formed in one or both arms. In fact, the can holder could completely surround the can and have a plurality of slits rather than one or two discreet guide bars.

The scribing and bending step of the present invention is an important feature of the invention since it provides an exceptionally smooth cut. While during the cutting operation, occasionally the knife will cut entirely through the side wall. This is not necessary and often distorts the edge of the longitudinal slits. Thus, preferably, the mark is merely scribed along the surface forming a sufficient groove so that the can will break at the scribe when manipulated.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A process for making a decorative item from an aluminum can having a cylindrical side wall and can ends said process comprising the steps of:

scribing a plurality of parallel grooves in a generally longitudinal direction in said cylindrical side wall to form a scribed side wall;

pressing inwardly repeatedly on the scribed side wall until the side wall breaks at the scribed grooves to form a plurality of longitudinal slats; and bending the longitudinal slats outwardly by applying axial force to said can ends to form a decorative item.

2. The process of making a decorative item of claim 1 wherein said plurality of grooves are longitudinal and equally spaced from one another.

3. The process of making a decorative item of claim 2 further including the step of placing a template having a plurality of equally spaced marking guides over said aluminum can and making a mark on the surface of said aluminum can at each of said guides and performing said scribing step at each one of said marks.

4. The process of making a decorative item of claim 1 further including the step of making a bend angled from the circumference of said can at each end of each longitudinal slats to cause each of said slats to bend at an angle with respect to the original side wall of said can so that said decorative object will turn in the wind.

* * * * *